Nov. 18, 1969  YOSHIYUKI NOGUCHI  3,478,623
SPEED REDUCTION DEVICE
Filed June 7, 1968  2 Sheets-Sheet 2
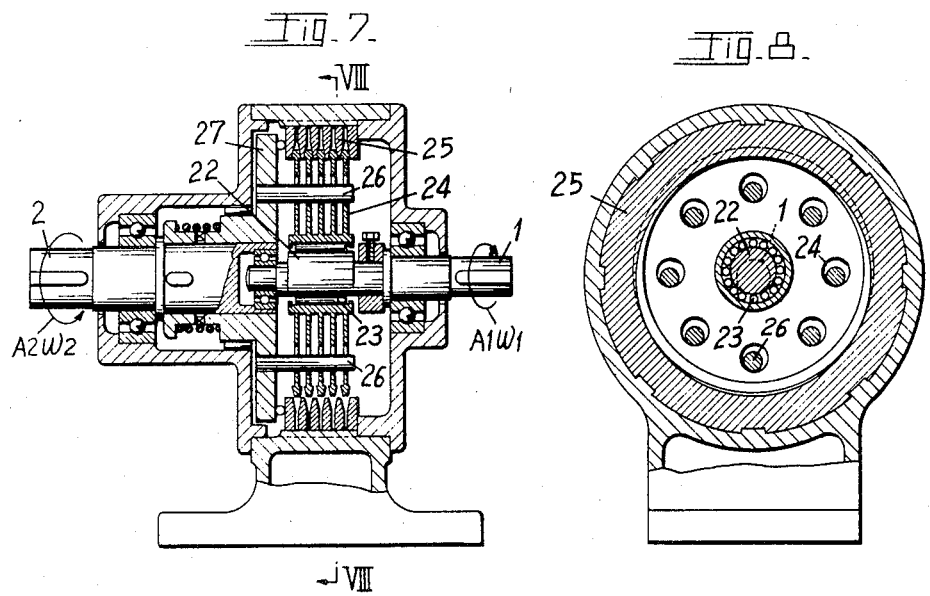
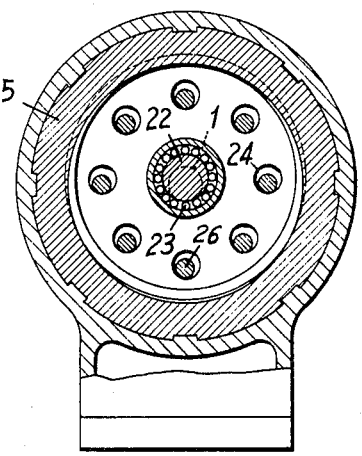
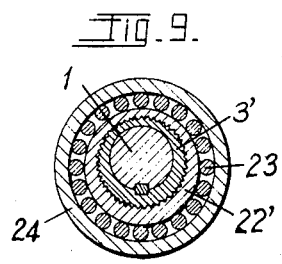
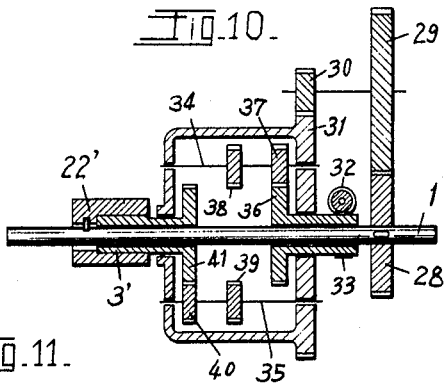
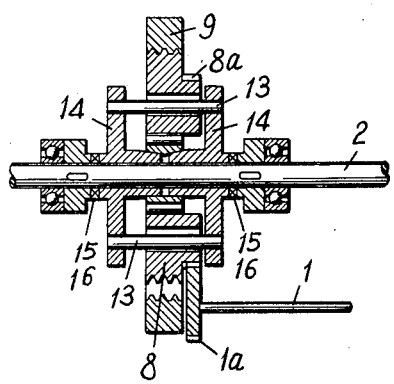

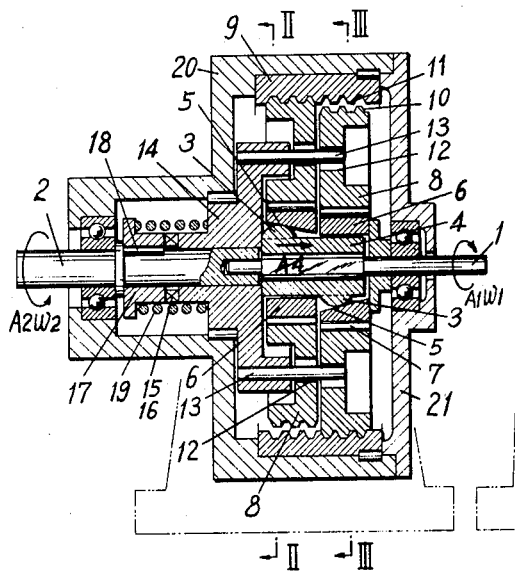
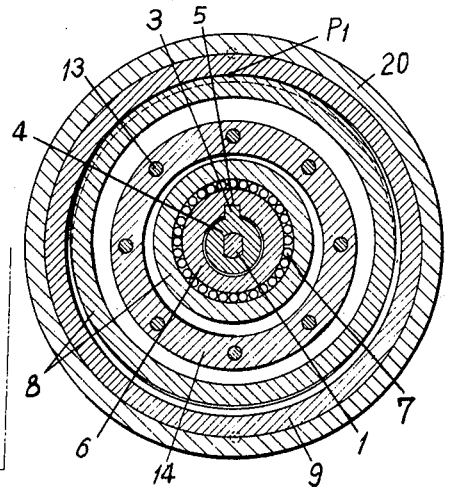
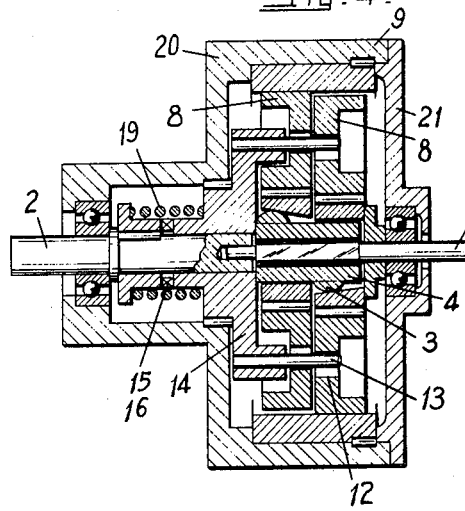
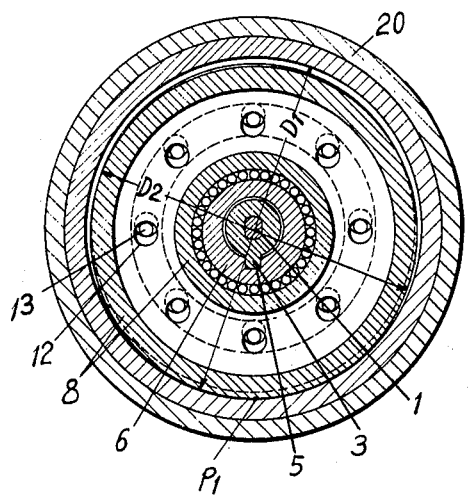
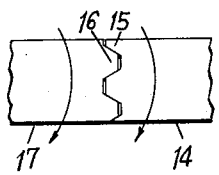
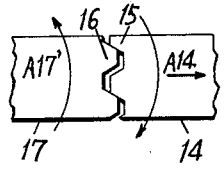

United States Patent Office 3,478,623
Patented Nov. 18, 1969

3,478,623
SPEED REDUCTION DEVICE
Yoshiyuki Noguchi, 141 Idogayakamicho, Minami-ku,
Yokohama-shi, Kanagawa-ken, Japan
Filed June 7, 1968, Ser. No. 735,265
Claims priority, application Japan, June 10, 1967,
42/36,997
Int. Cl. F16h 1/32, 13/06
U.S. Cl. 74—798                                        10 Claims

ABSTRACT OF THE DISCLOSURE

A speed reduction device, the combination of a drive shaft and a driven shaft axially aligned to each other, annular eccentric shafts mounted on the drive shaft rotatable therewith, rolling wheels surrounding the eccentric shafts, a fixed outer wheel concentrically disposed relative to the common axis of the driving and driven shaft and to accommodate said rolling shafts. Between the drive shaft and eccentric shafts is inserted a cam shiftable in axial direction whereby frictional contact of the rolling wheels to the fixed wheel is varied. The driven shaft mounts a disc flange having pins which extend through radial slots provided in the rolling wheels so that the rotation of rolling wheels is transmitted to the flange. At one end of the flange is formed a cam face which frictionally contacts another cam face provided in a sleeve mounted on the driven shaft. By frictional engagement of the cam faces and load imparted to the driven shaft, the flange and aforesaid shiftable cam connected thereto are constrained to shaft in an axial direction. A spring is interposed between the flange and sleeve thereby a frictional contact of the rolling wheels to the fixed wheel is produced even when the driven shaft is nonloaded.

---

This invention relates to an improved speed reduction device for use in general machine. More specifically, this speed reduction device is contemplated to transmit a rotary motion from one shaft at an accurate reduction ratio to another shaft in a novel manner with peculiar construction and arrangement of assemblies.

In the conventional types, there were found many disadvantages in carrying out speed reduction in an accurate and precise manner due to the complexity of device and difficulty in operating the same. The inventor, H. Hirakawa has made an improvement in such device as disclosed in copending U.S. patent application Ser. No. 519,676, 1966, yet there is somewhat difficulty in the operation of device for transmitting rotary motion at an appropriate reduction ratio particularly at the time when operation is started under nonload condition.

An object of this invention is to provide a speed reduction device that is enabled to produce a substantially large speed reduction ratio between a drive shaft and driven shaft that are disposed axially aligned to each other.

Another object of this invention is to provide a speed reduction device that is enabled to produce a speed reduction ratio with minimum force in a radial direction of the eccentric shafts on the drive shaft, yet operates with the highest efficiency.

Further object of this invention is to provide a speed reduction device that is enabled to accurately and constantly transmit a rotary motion of a shaft at a substantially reduced ratio to another shaft no matter whether a load imposed upon the driven shaft is larger or smaller, or even when such driven shaft is nonloaded.

Still other object of this invention is to provide a speed reduction device of compact shape which is enabled to transmit a rotary motion of a drive shaft simultaneously to two driven shafts yet at high speed reduction ratio without any difficulty.

These and other advantages will become manifestly clear when taken in conjunction with preferred embodiments now described with reference to the accompanying drawings.

FIG. 1 is a longitudinal cross-section view of a speed reduction device of the present invention.

FIG. 2 is a transverse cross-section view of the device taken along the line II—II in FIG. 1.

FIG. 3 is a transverse cross-section view of the device taken along the line III—III in FIG. 1.

FIG. 4 is a longitudinal section view of the device partly varied from that shown in FIG. 1.

FIG. 5 is a side view of cam faces in large scale showing engaging status to each other under nonloaded operation.

FIG. 6 is a side view of cam faces in large scale showing engaging status under loaded operation.

FIG. 7 is a longitudinal cross-section view of a speed reduction device of another embodiment.

FIG. 8 is a transverse cross-section view of the device taken along the line VIII—VIII in FIG. 7.

FIG. 9 is a transverse cross-section view of a combination of an eccentric shaft and eccentric wheel.

FIG. 10 is a transverse cross-section of an auxiliary means to adjust the combination of eccentric shaft and eccentric wheel.

FIG. 11 is a longitudinal section view of a device of still another embodiment.

Referring to the drawings, the speed reduction device of the present invention includes a drive shaft and a driven shaft. As seen in FIGS. 1–4, the drive shaft 1 has its end portion loosely received in the opening of the driven shaft 2 so that said drive shaft and driven shaft are disposed in axial alignment. The drive shaft is connected to a motor (not shown) or the like drive source.

Mounted on the drive shaft to be shiftable in axial direction and rotatable by spline means therewith is a cam portion 4. This cam portion includes two integrally formed projections 3, 3 being on the opposite sides and spaced apart with respect to the axis of the drive shaft on a substantially circular cam portion. A pair of eccentric wheels 6, 6 are received slidably on said cam portion. Said eccentric wheels 6, 6 being eccentric on the opposite sides of the axis of the drive shaft, each having a groove 5 on its inner periphery, which groove is so formed to be shallower in a direction as it remotes from the driven shaft. Surrounding each eccentric wheel 6 is a plurality of roller bearings 7 which supports rotatably thereon a rolling wheel 8. Each rolling wheel 8 is accommodated by a fixed outer wheel concentrically disposed relative to the axis of the drive shaft so that the outer diameter $D_2$ of the rolling wheel 8 is smaller than that of the inner diameter $D_1$ of the fixed outer wheel 9. The outer periphery of the rolling wheel 8 is constrained to frictionally contact with the inner periphery of the fixed outer wheel 9 at a point $P_1$ when the device is operated so that a substantial compressive force is applied to this point. Therefore the contact portion of both of the wheels 8 and 9 may be made with material having a high coefficient of friction such as rubber or synthetic resins, or circular ridges 10 may be provided on the outer periphery of the rolling wheel 8 and as well ridges 11 on the inner periphery of fixed outer wheel 9 so as to engage with each other. The device shown in FIGS. 1–3 is provided with such ridges 10 and 11 whilst that shown in FIG. 4 has none.

Each rolling wheels have slots 12 in the same radius line, said slots being registered in face-to-face relation through which pins 13 are loosely fitted. Said pins 13 are planted in a flange 14 that is loosely mounted on the driven shaft 2. Said flange 14 is formed a cam face 15 at the output side of driven shaft 2, which cam face is to frictionally engage with a mating cam face 16 provided in a sleeve 17 which is secured with a key 18 to driven shaft 2. A spring 19 is provided between said sleeve 17 and flange 14 to always bias the latter toward aforesaid shiftable cam 4. All the above components are housed in a casing 20 and a cover plate 21, from the opposite sides of which the drive shaft and driven shaft extend.

When the driving shaft 1 rotates at an angular velocity $\omega_1$ in the direction shown by the arrow $A_1$, the driven shaft 2 is rotated at an angular velocity $\omega_2$ in the direction shown by arrow $A_2$.

Upon the rotation of drive shaft 1, the cam 4 rotates therewith which in turn rotates the eccentric wheels 6, 6. The rotation of said eccentric wheels 6, 6 causes each rolling wheel 8 to take its own revolution round the drive shaft 1, thus each rolling wheel 8 comes to frictionally contact the fixed outer wheel 9 at the point $P_1$.

Hence said projections 3, 3 engaged with eccentric wheels 6, 6 being formed on the opposite sides of the cam 4 relative to the axis of drive shaft so that rolling wheels 8, 8 rotate in 180 degrees displacement to each other relative to the eccentricity.

The rotation of wheels 8, 8 in turn constrains the flange 14 to rotate by the connection of pins 13 which further in turn rotates the sleeve 17 by the frictional engagement of cam faces 15 and 16. The rotation of sleeve 17 ultimately rotates the driven shaft 2.

When the driven shaft 2 is nonloaded, the spring 19 forces flange 14 which in turn pushes the slidable cam portion 4 in a direction shown by arrow $A_4$ whereby the projection 3 integral with cam is forced to the shallower part in the groove 5 of eccentric wheel 6 so that the rolling wheel 8 is caused to produce a frictional contact against the inner periphery of fixed outer wheel 9.

When a load is imparted on driven shaft 2, the annular sleeve 17 is too imparted a force in a direction shown by arrow $A_{17}$ though the flange 14 tends to rotate the sleeve 17 whereby there is produced a severe frictional engagement between the abutting cam faces 15 and 16 as seen in FIG. 6 whereupon the flange 14 is constrained to be shifted in a direction shown by arrow $A_{14}$. This in turn forces the cam portion 4 in a direction shown by arrow $A_4$, thereby the projection 3 tends to shift toward shallower part of the groove 5. Hence the eccentricity of eccentric wheel is limited, said projection 3 tighteningly engages the bottom face of groove 5 which imparts a substantially strong compression in a radial direction which results in a strong frictional contact of rolling wheel 8 against the inner periphery of the fixed outer wheel 9. As the rolling wheel 8 rotates, it in turn rotates flange 14. The heavier a load is imparted on driven shaft 2, the more resistive frictional engagement is produced between the cam faces 15 and 16, whereby the projection 3 of aforesaid shiftable cam 4 is constrained to compressively engage to the bottom of the groove 5. This intensifies the force of eccentric wheel in a radial direction to constrain rolling wheel 8 to rotate.

Now let the angular velocity of driving shaft 1 be $\omega_1$ and that of driven shaft 2 be $\omega_2$, the inside diameter of fixed outer wheel 9, $D_1$, the outside diameter of rolling wheel 8, $D_2$ and the speed reduction ratio of $\omega_2$ to $\omega_1$ be $i$, then the following relation will be obtained:

$$i = \frac{\omega_2}{\omega_1} = -\frac{D_1 - D_2}{D_2} \quad (1)$$

where the negative sign (—) represents the fact that the rotations of $\omega_2$ and $\omega_1$ are opposed in the direction to each other. According to the Equation 1 above, if one selects the difference between the diameter $D_1$ of the pitch circle of the fixed wheel (9) and the diameter $D_2$ of the pitch circle of the rolling wheel 8 to have a value equal to $\frac{1}{10} \sim \frac{1}{100}$ of the pitch circle of the rolling wheel, that is, of $D_1 - D_2 = (\frac{1}{10} \sim \frac{1}{100})D_2$, then the speed reduction ratio $i$ takes a value equal to $\frac{1}{10} \sim \frac{1}{100}$ and thus a substantial speed reduction ratio may be obtained by means of a simple mechanism.

Referring now to FIGS. 7–10, there is shown the second embodiment of the present invention in which 1 represents a drive shaft and 2, driven shaft. Unitarily formed on the drive shaft 1 is an eccentric wheel 22 around which is placed a plurality of roller bearings 23. This roller bearing 23 receives thereon a plurality of rolling wheels 24, each spaced and shiftable in axial direction. A plurality of outer wheels 25 are concentrically disposed relative to the axis of drive shaft and in staggered relation to said rolling wheels 24. Each of the outer wheels 25 is shiftable in axial direction and so shaped to have a tapered surface to be thinner toward the inside periphery. Each rolling wheel 24 is provided with a number of bores in face-to-face relation to one another through which pins 26 loosely fit, which pins are planted in a flange 27 mounted concentrically on driven shaft 2. Other components are disposed just as like to that shown in FIGS. 1–4.

When the drive shaft 1 rotates at an angular velocity $\omega_1$ in the direction shown by arrow $A_1$, the driven shaft is rotated at an angular velocity $\omega_2$ in the direction shown by arrow $A_2$.

Upon the rotation of the drive shaft 1, the eccentric wheel 22 formed integrally therewith also rotates in an eccentric manner whereby the rolling wheels 24 are constrained to frictionally contact to the outer wheel 25 which are disposed in staggered relation to the former, whereupon said rolling wheels make their own revolution about the axis of drive shaft 1 which in turn rotates the flange 27 by pins 26 connected to the rolling wheels.

As seen in FIG. 8, hence the outer wheel 25 is shaped to be thinner toward its inner periphery so that frictional contact is produced only at the portion where both wheels most deeply engage whilst other portions do not engage because of the bevelled surface of outer wheel. Therefore there is not any loss in the action of eccentric wheel 22 to push the rolling wheel 24 toward the outer wheel 25 whereby a transmission efficiency is greatly increased.

When a load is imposed upon the driven shaft 2, cam faces 15 and 16 are acted to each other in the same manner as seen in FIGS. 1–6 whereby the flange 27 is forced in a direction toward the drive shaft 1. As a result the spacings between respective outer wheels 25 are narrowed to constrain the outer wheels 25 and rolling wheels to be in substantially tightened engagement whereby the rolling wheels 24 make their own revolution and this in turn transmit a rotary motion to the driven shaft at substantial reduction ratio. Thus it may be good for the eccentric wheel 22 to act only upon the rolling wheels 24 with a minimum force in a radial direction. As there is not any loss in the force in the radial direction produced by the eccentric wheel, transmission efficiency is greatly enhanced.

Now let it be assumed that the angular velocity of the driving shaft 1 be $\omega_1$, the angular velocity of the driven shaft, $\omega_2$, the diameter of inner circumference of outer wheel 25, $D_1$, and the diameter of outer circumference of rolling wheel 24, $D_2$, then the reduction ratio of $\omega_2$ to $\omega_1$ will come just as in the case of the first embodiment as follows:

$$i = \frac{\omega_2}{\omega_1} = -\frac{D_1 - D_2}{D_2}$$

In this second embodiment, hence the outer wheel 25 and rolling wheels 24 are to be shiftable in an axial direction as seen in FIGS. 9 and 10, the speed reduction ratio $i$ may be determined by assuming various combinations of the eccentricity in respects of the eccentric shaft 3' and eccentric wheel 22.

In the arrangement shown in FIG. 9, hence the eccentric shaft 3' is being splined to the eccentric wheel 22', the eccentricity may be varied by displacing the eccentric wheel 22' relative to the eccentric shaft 3'. These two elements may have threads so as to obtain various combinations of eccentricity.

In order to carry out another way of adjustment of eccentricity, an auxiliary mechanism may be provided as shown in FIG. 10 wherein a worm gear 32 is operated to rotate a toothed worm 33 which successively operates in turn a gear 36 integral with said gear 33, thereto engaged gear 37, its bearing gear shaft 34, thereon mounted gear 38, thereto engaging gear 39, its bearing shaft 35, thereon mounted gear 40, thereto engaging gear 41 whereupon the eccentric shaft 3' integrally formed with said gear 41 is turned relative to drive shaft 1, thus the eccentricity is varied with the combination of the eccentric shaft and eccentric wheel relative to the drive shaft 1.

In the next, the worm is held stationary and the drive 1 is rotated, then the gear 28 keyed thereto rotates which in turn successively rotates gear 29, gear 30. This in turn rotates a case 31 which bears said gear shaft 34 and 35. As the case 31 rotates, the gear shafts 34 and 35 are constrained to make a revolution around the drive shaft 1. With the revolution of said gear shaft 34, gear 37 is moved round the dead gear 36 while the gear shaft 34 makes its own revolution, this in turn rotates the gear 38, in turn rotates the gear 39, thereby the gear shaft 35 is constrained to make its own revolution, this in turn rotates gear 40, in turn rotates gear 41 whereupon the eccentric shaft 3' is turned. By providing desired number of teeth of gears, the rotation of the eccentric shaft 3' may be made as same with that of the drive shaft 1. In order that the eccentric wheel 22' may make the same rotation with that of the drive shaft 1, it may be pinned to the drive shaft to be shiftable only in a diametrical direction. Thus by operating said worm 32, the displacement of the eccentric wheel 3' relative to the drive shaft 1 may be adjusted whereby the selected speed reduction ratio may be obtained now and then.

The third embodiment is shown in FIG. 11 in which driven shafts 2 extend to the opposite sides of a speed reduction device.

The drive shaft 1 unitarily mounts an eccentric gear 1a which engages a gear 8a that is provided at one side of the rolling wheel 8 which rotates in an eccentric manner whereby the rolling wheel 8 frictionally contacts the fixed outer wheel 9 whereupon said rolling wheel makes its own revolution which in turn rotates flanges 14 by means of pins 13 and further in turn rotates the driven shaft 2 by the frictional engagement of cam faces 15 and 16. When a load on the driven shaft is increased by the action of cams, the frictional contact of the bevelled face integrally formed with flange 14 against the corresponding bevelled face of eccentric wheel is intensified so that the compressive force of rolling wheel 8 against the fixed outer wheel 9 is increased whereupon the revolution of rolling wheel is more secured.

As apparent from the description above, the speed reduction device according to the present invention is simple in its construction and can obtain various speed reduction ratio very accurately and delicately as compared with the conventional speed reduction devices.

Although the invention has been particularly described with reference to preferred embodiments thereof, it is to be understood that modification and variations may be effected without departing from the scope of the invention.

I claim:
1. A speed reduction device which comprises a drive shaft and a driven shaft axially aligned to each other, a cam mounted on said drive shaft to be slidable thereon but rotatable therewith and having projections, eccentric wheels outside said cam each having a groove on its inner periphery which groove becomes shallower in a direction as it remotes from the driven shaft into which said projection engages, rolling wheels outside said eccentric wheels, a fixed outer wheel concentrically disposed relative to the axis of said drive shaft to inscribe each of said rolling wheels, a flange on said driven shaft interconnected to each of said rolling wheels by means of pins and said flange having a cam face to be engageable with cam face provided on said driven shaft.

2. A speed reduction device as claimed in claim 1 wherein said cam having two projections each displaced 180 degrees relative to the axis of drive shaft.

3. A speed reduction device as claimed in claim 1, wherein said flange is provided with a spring to always force said slidable cam.

4. A speed reduction device as claimed in claim 1, wherein each of said rolling wheels having a ridged outer periphery in engagement with an inner ridged periphery of said fixed outer wheel.

5. A speed reduction device as claimed in claim 1 wherein the outer periphery of said rolling wheels and the inner periphery of said fixed outer wheel are non-ridged to have a smooth face.

6. A speed reduction device which comprises a drive shaft and driven shaft axially aligned to each other, an eccentric wheel mounted on said drive shaft to be rotatable therewith, a plurality of rolling wheels mounted outside said eccentric wheel to be shiftable in an axial direction, a plurality of outer wheels concentrically disposed relative to the driving axis, said outer wheels shiftable in an axial direction and inscribing said rolling wheels, a flange on said driven shaft connected by pins to said rolling wheels and said flange is connected to said driven shaft by cam means.

7. A speed reduction device as claimed in claim 6, wherein each of said outer wheel is taperly thinned in cross section toward inner periphery to form a bevelled surface.

8. A speed reduction device as claimed in claim 6, said flange is provided with a spring means to force said outer wheels in an axial direction.

9. A speed reduction device as claimed in claim 6, wherein two eccentric elements may be displaced relative to each other whereby the eccentricity of said rolling wheels may be varied.

10. A speed reduction device as claimed in claim 1, wherein an eccentric gear mounted on the drive shaft is engaged with a gear provided on the rolling wheel and by revolution of said rolling wheel, driven wheels extending to the opposite sides of said device are simultaneously rotated.

References Cited

UNITED STATES PATENTS

| 2,475,504 | 7/1949 | Jackson | 74—804 |
| 3,160,032 | 12/1964 | Black | 74—804 |

FRED C. MATTERN, Jr., Primary Examiner

W. S. RATLIFF, Jr., Assistant Examiner

U.S. Cl. X.R.

74—804